US007469865B2

(12) United States Patent
Mayorga

(10) Patent No.: US 7,469,865 B2
(45) Date of Patent: Dec. 30, 2008

(54) SPRINKLER ANCHOR

(76) Inventor: Pete Mayorga, 109 Collins St., Conroe, TX (US) 77301

(*) Notice: Subject to any disclaimer, the term of this patent is extended or adjusted under 35 U.S.C. 154(b) by 16 days.

(21) Appl. No.: 11/356,231

(22) Filed: Feb. 17, 2006

(65) Prior Publication Data

US 2006/0284029 A1 Dec. 21, 2006

Related U.S. Application Data

(60) Provisional application No. 60/690,525, filed on Jun. 15, 2005.

(51) Int. Cl.
*B05B 15/06* (2006.01)
*A62C 31/22* (2006.01)
*F16M 13/00* (2006.01)

(52) U.S. Cl. .......................... 248/85; 248/87; 248/156; 248/530; 239/276

(58) Field of Classification Search ................. 248/530, 248/85, 87, 80, 156, 545; 47/43, 48.5; 411/80.1, 411/358, 922, 998, 410, 427, 356; 239/276, 239/279, 73, 97, 745
See application file for complete search history.

(56) References Cited

U.S. PATENT DOCUMENTS 324,768 A * 8/1885 Hunt .......................... 411/358
3,473,770 A * 10/1969 Edgerton ..................... 248/87
3,675,694 A * 7/1972 Barlow ....................... 411/403
3,941,342 A 3/1976 Bradshaw
4,289,058 A * 9/1981 Paskert ....................... 411/456
4,708,552 A * 11/1987 Bustos et al. ............. 411/80.1
4,870,781 A * 10/1989 Jones ........................... 47/43
5,145,301 A * 9/1992 Yamamoto ................... 411/82
5,524,855 A * 6/1996 Lesar ......................... 248/530
5,632,464 A * 5/1997 Aberle ....................... 248/530
5,687,909 A 11/1997 Dean
5,881,495 A * 3/1999 Clark ......................... 47/48.5
6,293,745 B1 * 9/2001 Lu ............................. 411/410
6,461,084 B1 * 10/2002 Stuart ......................... 248/156
D497,973 S 11/2004 Schapper
2004/0079025 A1 4/2004 Snell et al.
2004/0089739 A1 5/2004 Corbett et al.
2004/0149835 A1 8/2004 Zur et al.
2004/0163972 A1 8/2004 Buckley
2004/0169121 A1 9/2004 Winn

* cited by examiner

*Primary Examiner*—Anita M King
(74) *Attorney, Agent, or Firm*—Richard C. Litman

(57) ABSTRACT

The sprinkler anchor is designed to anchor and support a convention sprinkler head having a ground spike and includes an upper support plate and a hollow, tapered stake. The upper support plate and the stake form a continuous aperture for receiving the ground spike of the sprinkler head, with the stake being configured for engaging the ground. The sprinkler anchor may further include at least two linear channels, one or more hollow flanges, a plurality of anchoring studs, and a cap. The linear channels, hollow flanges, and anchoring studs are provided to further help the sprinkler anchor in receiving the sprinkler head and securing it into the ground. The cap is designed to cover the sprinkler anchor when not in use in order to prevent debris from entering.

8 Claims, 6 Drawing Sheets

SPRINKLER ANCHOR

CROSS-REFERENCE TO RELATED APPLICATION

This application claims the benefit of U.S. Provisional Patent Application Ser. No. 60/690,525, filed Jun. 15, 2005.

BACKGROUND OF THE INVENTION

1. Field of the Invention

The present invention relates to anchoring devices for lawn care systems, and more specifically to an anchoring device for supporting a manual sprinkler head having a ground spike.

2. Description of the Related Art

The watering of lawns and flower beds is a required activity in city and suburbs throughout the country. The task can be automated by installing subsurface water piping to feed sprinklers that rise above ground and rotate when the water pressure is turned on and then settle to ground level when the water flow stops. The system can be further automated to start up at a pre-selected time and run for a predetermined amount of time. Few residences or businesses can afford a system of this type. By far, the more common method to water lawns relies on the manual placing of sprinkler heads in the area to be water and retrieving them after an appropriate time.

These sprinkler heads are typically designed with spikes firmly attached, which are pushed into the ground to support the sprinkler and removed when the watering is complete. In this operation, the setting and resetting of spiked sprinkler heads is an arduous and troublesome task. But the spiked sprinkler head must be removed as they present a hazard to children playing on the lawn and an accident waiting to happen when mowing the lawn.

An alternative to the spiked water sprinkler is the type of sprinkler wheel that is connected to a four-legged platform. These devices do avoid the need for pulling up spiked sprinklers but they are subject to tipping over under use and they can are expensive. Of course, they too must be removed before the lawn is mowed.

Clearly, the need to remove spiked sprinklers each time the lawn is to be mowed is a problem, as is the stability of the four-legged platform sprinkler. Thus, a sprinkler anchor for supporting a manual sprinkler head having a ground spike solving the aforementioned problems is desired.

SUMMARY OF THE INVENTION

The sprinkler anchor is designed to anchor and support a sprinkler head having a ground spike and includes an upper support plate and a hollow, tapered stake. The upper support plate has a top side and a bottom side and a center aperture therethrough. The hollow, tapered stake depends from the bottom side of the upper support plate proximal to the center aperture, forming a continuous aperture with the center aperture for receiving the ground spike of the sprinkler head.

The sprinkler anchor may further include at least two linear channels, one or more hollow flanges, a plurality of anchoring studs, and a cap. The linear channels are disposed through the upper support plate and intersect at the center aperture, forming a continuous aperture therewith. The one or more hollow flanges depend from the bottom side of the upper support plate adjacent to one of linear channels and are configured to receive the winged sides that may be part of the ground spike of the sprinkler head. The plurality of anchoring studs depend from the periphery of the bottom side of the upper support plate for helping to further support the sprinkler anchor in the ground. The cap is designed to cover the sprinkler anchor when not in use and has a top side and a bottom side with a handle member extending from the top side and a plug member depending from the bottom side. The plug member is configured to fit tightly within the linear channels disposed along the top side of the upper support plate.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
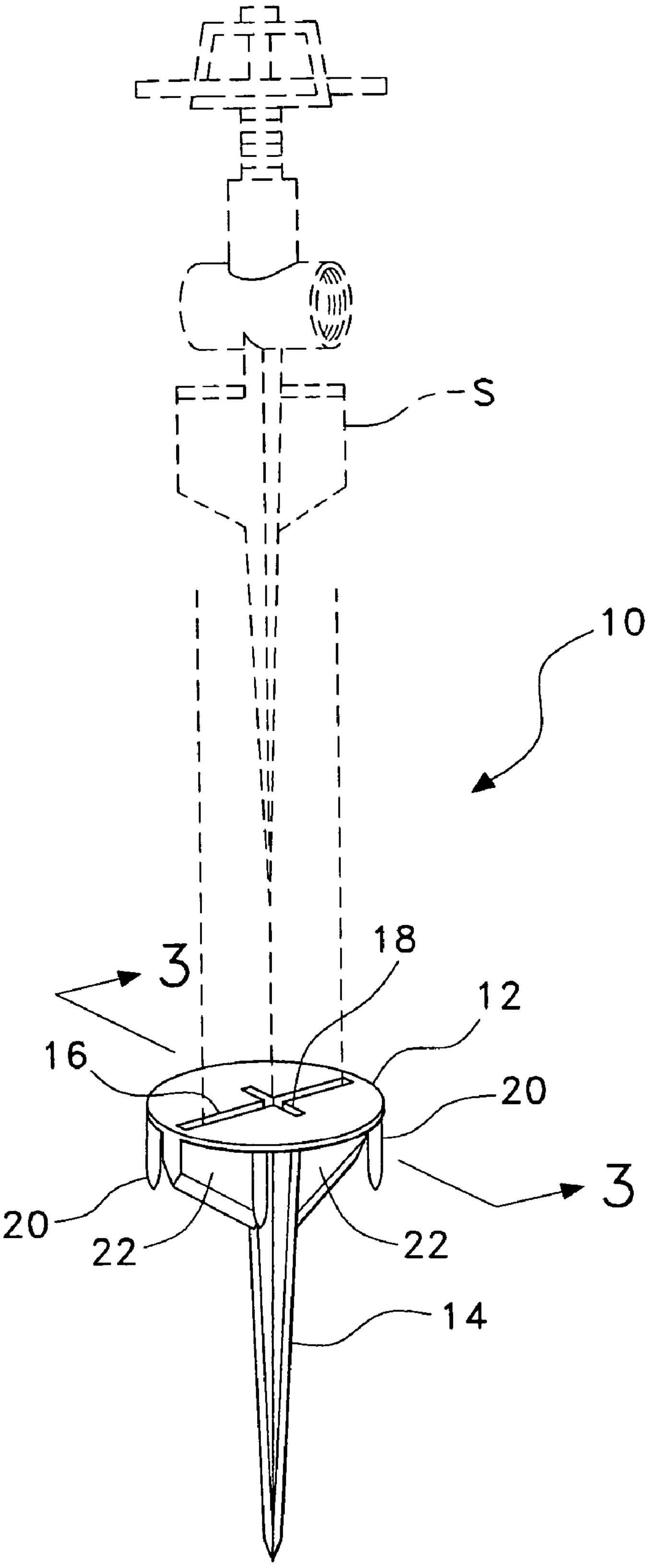
FIG. 1 is an exploded, environmental view of a sprinkler anchor for supporting a sprinkler head having a ground spike according to the present invention.

The present invention is a sprinkler anchor, a preferred embodiment of which is designated generally as 10 in the drawings, for supporting and anchoring a traditional sprinkler head having a ground spike.

Referring to FIGS. 1, 2A, 2B, 2C, and 3, anchor 10 is shown including an upper support plate 12, a hollow, tapered stake 14, linear channels 16 and 18, a plurality of hollow flanges 22, a plurality of anchoring studs 20, and a cap 24. Upper support plate 12 has a top side and a bottom side and a center aperture therethrough. Hollow, tapered stake 14 is depends from the bottom side of upper support plate 12 proximal the center aperture therethrough, and forms a continuous aperture with the center aperture for receiving the ground spike of sprinkler head S. Hollow, tapered stake 14 terminates in a point and is, itself, designed to engage the earth, in the same manner as the ground spike of sprinkler head S would. In a preferred embodiment, upper support plate 12 is circular in shape.

Linear channels 16 and 18 are disposed through upper support plate 12, with linear channels 16 and 18 intersecting at the center aperture and forming a continuous aperture therewith. In a preferred embodiment, linear channels 16 and 18 include major channel 16, which extends substantially across a length of upper support plate 12, and minor channel 18 that perpendicularly intersects major channel 16. Linear channels 16 and 18 are designed to receive the winged sides that may be incorporated into the ground spike of sprinkler head S as it is secured into anchor 10. Hollow flanges 22 depend from the bottom side of upper support plate 12 adjacent to channel 16 and are configured to receive and retain the winged sides of the ground spike of sprinkler head S. Hollow flanges 22 are tapered and receive and retain the winged sides of the ground spike of sprinkler head S, such as to facilitate the entering of anchor 10 into the earth. Anchoring studs 20 are tapered and depend from the periphery of the bottom side of upper support plate 12 and provide further assistance in securing anchor 10 into the earth.

Figure 2A:
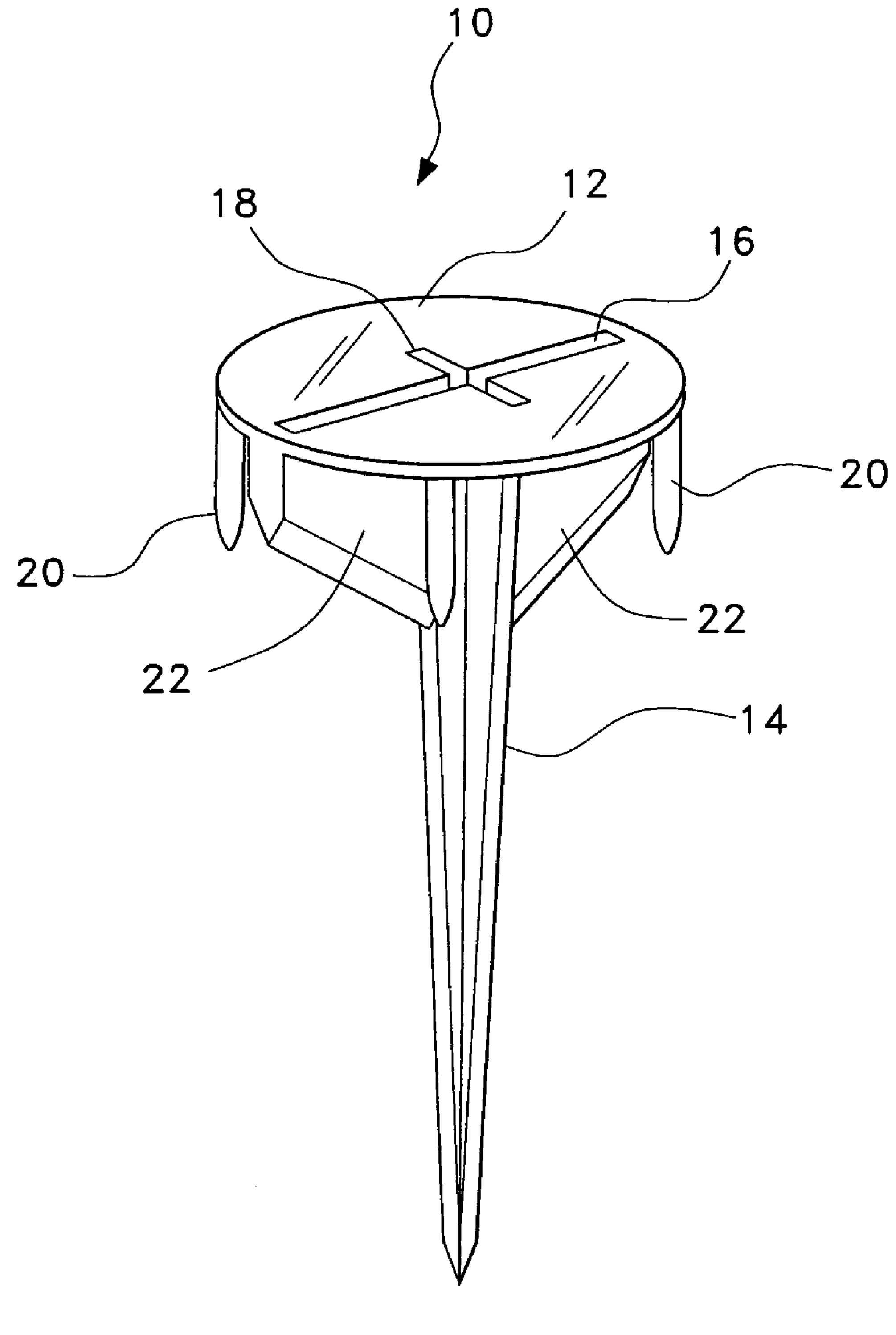
FIG. 2A is a perspective view of a sprinkler anchor according to the present invention.
Figure 2B:
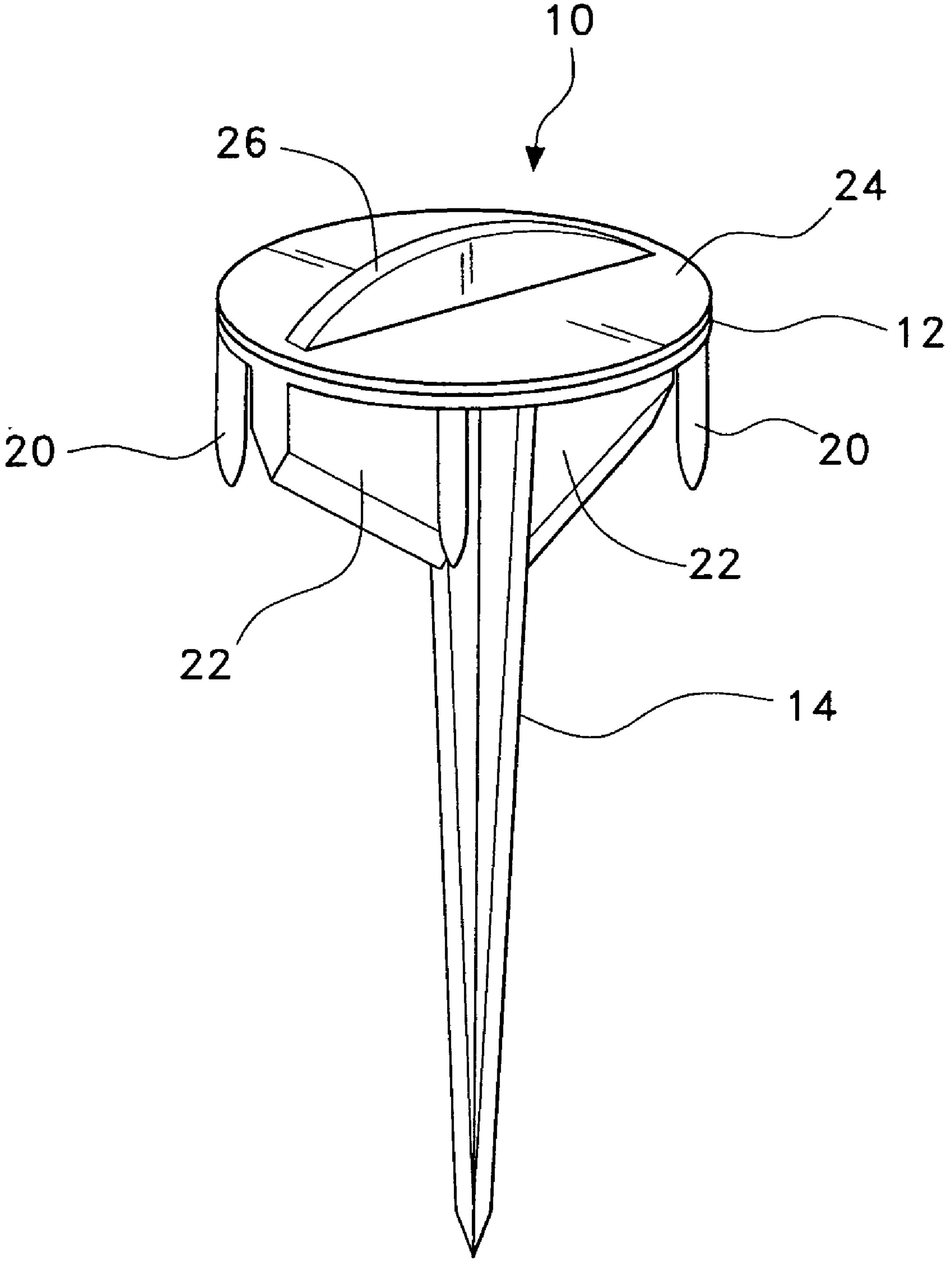
FIG. 2B is a perspective view of a sprinkler anchor with attached cap according to the present invention.
Figure 2C:
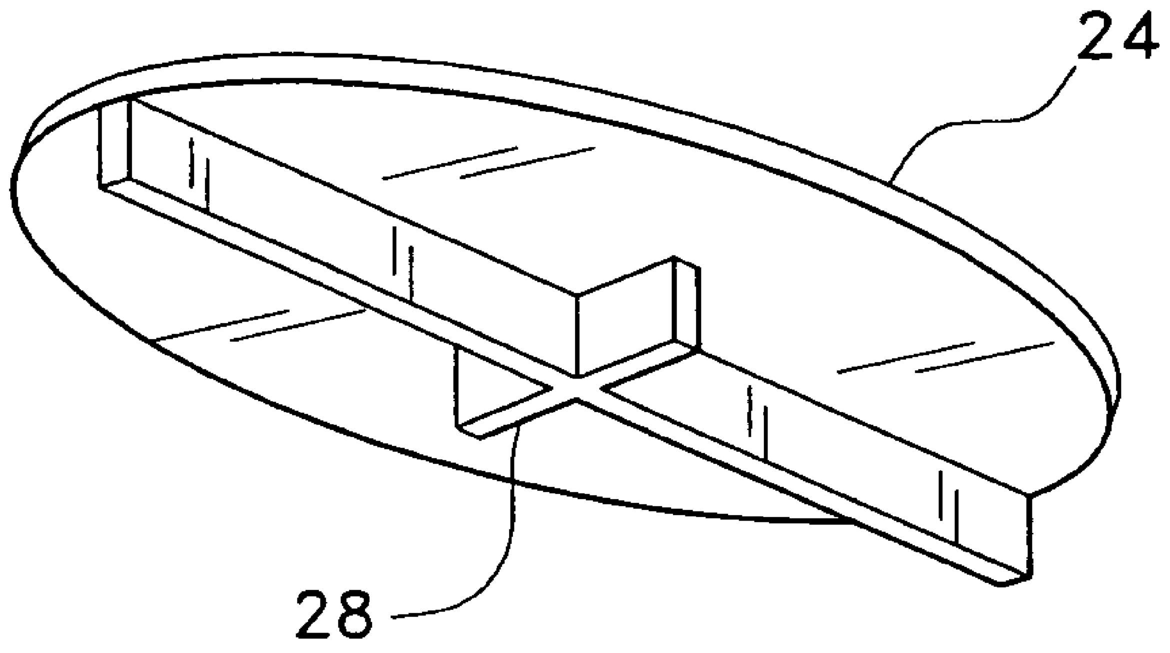
FIG. 2C is a bottom perspective view of the cap for use with the sprinkler anchor of the present invention.
Figure 3:
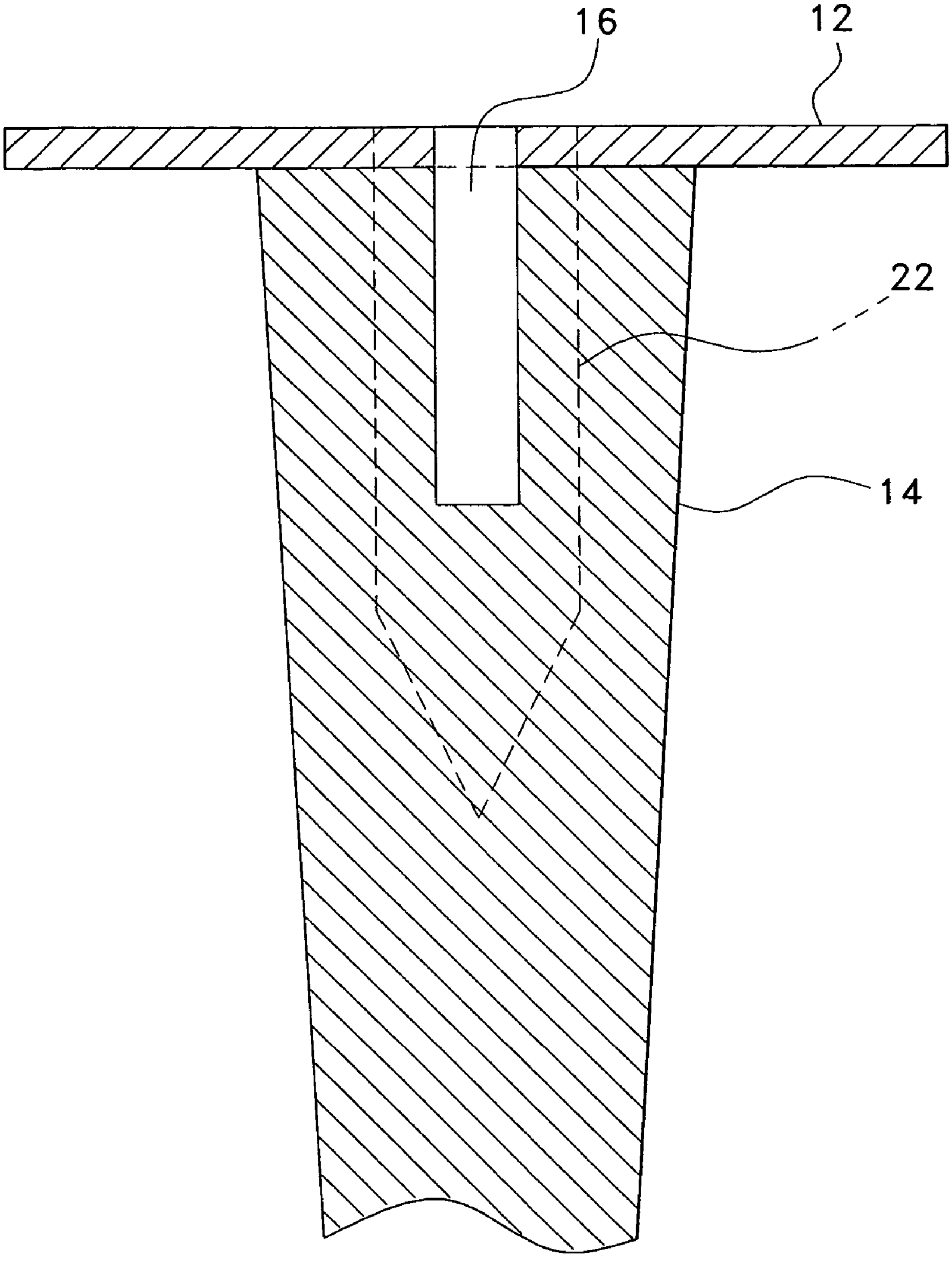
FIG. 3 is a cross-section view taken along line 3-3 of FIG. 1.
Figure 4:
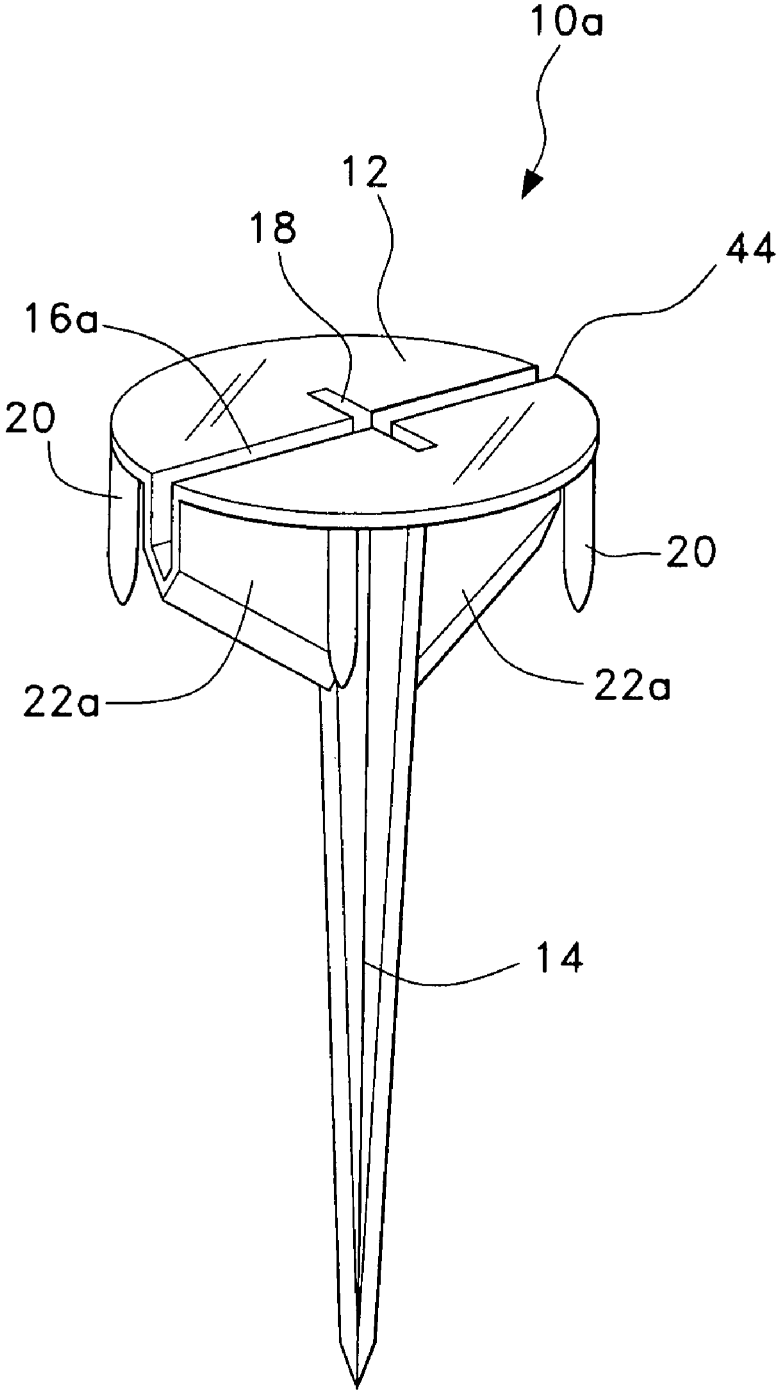
FIG. 4 is a perspective view of an alternate embodiment of a sprinkler anchor according to the present invention.

In an alternate embodiment, anchor 1O*a* is shown in FIG. 4 to be similar in structure to anchor 10 of FIG. 2A, including an upper support plate 12, a hollow, tapered stake 14, linear channels 16*a* and 18, a plurality of hollow flanges 22*a*, and a plurality of anchoring studs 20. However, linear channel 16*a* extends across an entire length of upper support plate 12. In this alternate embodiment, hollow flanges 22*a* have an open end 44 along the peripheral edge of upper support plate 12.

Cap 24 is designed to cover anchor 10 over upper support plate 12 in order to protect anchor 10 from receiving dirt and debris when not in use. Cap 24 has a top side and a bottom side, with a handle member 26 extending from the top side and a plug member 28 depending from the bottom side. Handle 26 facilitates the application and removal of cap 24 from anchor 10 and plug member 28 is configured to fit tightly within linear channels 16 and 18 disposed through upper support plate 12, such that cap 24 is held tightly in place when anchor 10 is not in use.

Sprinkler anchor 10 is designed to be placed in the ground in a location where the water spray from sprinkler head S, which is supported and anchored by anchor 10, can wet the surrounding grass or foliage. Sprinkler anchor 10 overcomes the common problem of implanting the ground spike of sprinkler head S into the ground each time the lawn or shrubbery bed is to be watered. Instead of repeatedly pushing sprinkler head S and its ground spike in the ground at various locations, the more permanent anchor 10, which easily accommodates Sprinkler head S, is implanted in the desired locations. When not is use, sprinkler anchor 10 is covered and closed with cap 24 to keep debris from getting inside the device.

When sprinkler anchor 10 is installed in the earth, stake 14 is fully embedded in the ground and the bottom side of upper support plate rests along the ground. Cover 24 is removed and the ground spike of conventional sprinkler head S is inserted into hollow, tapered stake 14. When watering is finished, sprinkler head S is removed from anchor 10 and cap 24 is placed back on along upper support plate 12. The covered upper support plate 12 lies well below the cutting height of a lawn mower, so that the lawn can be mowed without any concern about the mower blade striking sprinkler anchor 10.

It is to be understood that the present invention is not limited to the embodiments described above, but encompasses any and all embodiments within the scope of the following claims.

I claim:

1. An anchor for a sprinkler head having a ground spike with winged sides, comprising:
- an upper support plate having a top side and a bottom side and a center aperture therethrough;
- at least two linear channels disposed through the upper support plate, the at least two linear channels intersecting at the center aperture and forming a continuous aperture therewith, wherein the at least two linear channels includes a major channel that extends substantially across a length of the upper support plate and a minor channel that perpendicularly intersects the major channel;
- a hollow, tapered stake depending from the bottom side of the upper support plate proximal the center aperture therethrough, wherein the hollow, tapered stake forms a continuous aperture with the center aperture for receiving the ground spike of the sprinkler head; and
- one or more hollow flanges depending from the bottom side of the upper support elate adjacent one of the at least two linear channels, wherein the hollow flanges are configured to receive the winged sides of the ground spike of the sprinkler head.

2. The sprinkler anchor according to claim 1, further comprising a plurality of anchoring studs depending from the periphery of the bottom side of the upper support plate.

3. The sprinkler anchor according to claim 2, further comprising a cap having a top side and a bottom side, the cap having a handle member extending from the top side and a plug member depending from the bottom side, the plug member being configured to fit tightly within the at least two linear channels disposed through the upper support plate.

4. An anchor for a sprinkler head having a ground spike, comprising:
- an upper support plate having a top side and a bottom side and a center aperture therethrough;
- a hollow, tapered stake depending from the bottom side of the upper support plate proximal the center aperture therethrough, wherein the hollow, tapered stake forms a continuous aperture with the center aperture for receiving the ground spike of the sprinkler head;
- at least two linear channels disposed through the upper support plate, the at least two linear channels intersecting at the center aperture and forming a continuous aperture therewith;
- one or more hollow flanges depending from the bottom side of the upper support plate adjacent one of the at least two linear channels, wherein the hollow flanges are configured to receive winged sides of the ground spike of the sprinkler head; and
- a plurality of anchoring studs depending from the periphery of the bottom side of the upper support plate.

5. The sprinkler anchor according to claim 4, wherein the at least two linear channels includes a major channel that extends substantially across a length of the upper support plate and a minor channel that perpendicularly intersects the major channel.

6. The sprinkler anchor according to claim 4, further comprising a cap having a top side and a bottom side, the cap having a handle member extending from the top side and a plug member depending from the bottom side, the plug member being configured to fit tightly within the at least two linear channels disposed through the upper support plate.

7. An anchor for a sprinkler head having a ground spike with winged sides, comprising:
- an upper support plate having a top side and a bottom side and a center aperture therethrough;
- a hollow, tapered stake depending from the bottom side of the upper support plate proximal the center aperture therethrough, wherein the hollow, tapered stake forms a continuous aperture with the center aperture for receiving the ground spike of the sprinkler head;
- at least two linear channels disposed through the upper support plate, the at least two linear channels intersecting at the center aperture and forming a continuous aperture therewith;
- one or more hollow flanges depending from the bottom side of the upper support plate adjacent one of the at least two linear channels, wherein the hollow flanges are configured to receive the winged sides of the ground spike of the sprinkler head;
- a plurality of anchoring studs depending from the periphery of the bottom side of the upper support plate; and
- a cap having a top side and a bottom side, the cap having a handle member extending from the top side and a plug member depending from the bottom side, the plug member being configured to fit tightly within the at least two linear channels disposed through the upper support plate.

8. The sprinkler anchor according to claim 7, wherein the at least two linear channels includes a major channel that extends substantially across a length of the upper support plate and a minor channel that perpendicularly intersects the major channel.

* * * * *